United States Patent [19]
Volejnik et al.

[11] 4,320,366
[45] Mar. 16, 1982

[54] CARRIER FREQUENCY COMMUNICATION TRANSMISSION SYSTEM HAVING PREMODULATION

[75] Inventors: Wilhelm Volejnik; Friedrich Kuenemund, both of Munich; Karl Traub, Olching; Hans Albsmeier, Munich, all of Fed. Rep. of Germany

[73] Assignee: Siemens Aktiengesellschaft, Berlin & Munich, Fed. Rep. of Germany

[21] Appl. No.: 916,292

[22] Filed: Jun. 16, 1978

[30] Foreign Application Priority Data

Jul. 1, 1977 [DE] Fed. Rep. of Germany ....... 2629839

[51] Int. Cl.³ .................... H03H 9/46; H03H 9/50; H03H 9/70
[52] U.S. Cl. .................................. 333/197; 333/133; 333/186
[58] Field of Search ............... 333/186, 187, 189, 197, 333/201, 132–133; 179/1 D

[56] References Cited

U.S. PATENT DOCUMENTS

| | | | |
|---|---|---|---|
| 3,495,188 | 2/1970 | Kopp | 332/23 |
| 3,577,180 | 5/1971 | Albsmeier et al. | 333/72 |
| 3,931,600 | 1/1976 | Nagashima et al. | 310/321 X |
| 4,124,829 | 11/1978 | Kuenemund | 333/197 |

OTHER PUBLICATIONS

Börner–"Mechanische Filter für die Tragerfrequentztechnik", NTF, 19, 1960; pp. 34–37.

*Primary Examiner*—Marvin L. Nussbaum
*Attorney, Agent, or Firm*—Hill, Van Santen, Steadman, Chiara & Simpson

[57] ABSTRACT

A carrier frequency communication transmission system has a premodulation band above the transmission position of the base primary group of 60–108 kHz and utilizes mechanical filters as channel filters and also a common group filter in order to filter out the primary group band. Bending resonators having longitudinal coupling are utilized as the mechanical filters. The frequency range of the premodulation band at its lower limit is determined by a frequency spacing of at least 4 kHz from the upper band limit of the primary group band and the upper limit of the frequency range is determined in that the interfering natural oscillations, inasmuch as they occur in the lower stop band of the channel filter, lie at least 12 kHz below the lower limit of the primary group band. Highly stabilized piezo ceramics is used as the electromechanical transducer material.

10 Claims, 5 Drawing Figures

A-A

CARRIER FREQUENCY COMMUNICATION TRANSMISSION SYSTEM HAVING PREMODULATION

BACKGROUND OF THE INVENTION

1. Field of the Invention

The present invention relates to a carrier frequency communication transmission system having a premodulation band lying above the transmission position of the primary group band of 60–108 kHz, and more particularly to such a system in which mechanical filters are utilized as channel filters and also a common group filter in order to filter out the primary group band.

2. Description of the Prior Art

In order to transpose 12 voice channels into the base primary group band position of a TF system, the premodulation technique has been proven advantageous. The frequency spectrum of an input signal in the premodulation technique is displaced into the premodulation position in a first transposition step. A channel filter connected to the output of the modulator in this step limits the transmitted frequency band and suppresses undesirable modulation products. In a second conversion step, the frequency spectrum is displaced into the frequency position of the primary group band, i.e. 60–108 kHz. The undesirable modulation parts of the second conversion step are suppressed in the group filter.

It is already known in the art to establish the premodulation band in the frequency range of 48–52 kHz and to arrange the channel carrier frequencies above the primary group band. In this connection, for example, see the German Allowed Application No. 1,274,663. In this system, a common group filter is utilized for filtering out the primary group band arranged in inverted frequency, the group filter being designed as a band pass filter. Mechanical filters, designed as longitudinally coupled bending resonators, are utilized as channel filters for this purpose.

Such a system has the advantage that no multiples of the input signal or undesired summation of differential products of the input signal with the carrier frequencies fall into the higher transmission positions during additional conversions. The bending resonators in this frequency range are both small in dimension and can be produced economically.

The article "Mechanical Filters for the Carrier Frequency Techique", by M. Boerner, published in the periodical "NTF", 19, 1960, pp. 34–37, describes a premodulation system having mechanical filters in which the premodulation band lies at 200 kHz, i.e. above the primary group band, whereby torsion resonators having longitudinal coupling are utilized as mechanical filters. On the basis of the essentially greater dimensions of mechanical filters with torsion resonators in contrast to mechanical filters with bending resonators, their utilization in a frequency band below the primary group band is not possible if one is bound to prescribed dimensions, particularly provided by the standardized printed circuit plates. This known premodulation system also utilizes a common group filter in order to filter out primary group.

Furthermore, a mechanical filter having bending resonators is known from the German Letters Pat. No. 1,541,975, these resonators being coupled together by coupling wires attached to the center, or close to the center whose support is low in feedback via respectively two holding wires which are attached to the bending node and which, for example, are driven by piezo electric transducers.

SUMMARY OF THE INVENTION

It is the object of the present invention to provide a carrier frequency communication transmission system having premodulation and having an improved spurious response behavior with respect to the mechanical filters utilized in the system.

In order to achieve the foregoing object, the carrier frequency communication transmission system is designed such that bending resonators having longitudinal coupling are utilized as mechanical filters, and that the frequency range of the premodulation band is determined at its lower limit by means of spacing of at least 4 kHz from the upper limit frequency of the primary group band, and the upper limit of the frequency range is determined in that the spurious responses, as far as they occur in the lower stop band of the channel filter, lie at least 12 kHz below the lower limit of the primary group band, and that highly stabilized piezo ceramics is used as the electromechanical transducer material.

A premodulation system is obtained by the aforementioned measures and can be constructed with a group filter designed as a low pass filter. The group filter is thereby considerably simplified in production and design. Simultaneously, the advantage in contrast to the known premodulation system having torsion filters is obtained in that spurious responses in the low stop band of the channel filter no longer have an interfering influence upon the primary group band, for example, even at the higher frequency positions.

By means of the advantageous spurious response of the circuit arrangement constructed in accordance with the present invention it is also possible to construct the electric terminal circuits as simply tuned transformers which are then primarily used for optimum matching of the filters to the modulators.

The property of the bending resonators can simultaneously be utilized advantageously in that the lower resonator pole of the mechanical resonators is higher than in torsion resonators, whereby its steepening effect toward the lower filter pass band edge is particularly great, which effect must always be very steep in order to suppress the carrier and the lower side band. The mechanical stability of the bending resonator is considerably greater than in the torsion resonator by means of the possiblity provided in the bending resonator of attaching supporting wires to two spatially separated bending oscillation nodes.

The mounting of the coupling wire in the center of the bending resonstor is possible in the range of the flattest portion of the amplitude curve, in contrast to the torsion resonator, whereby a considerably smaller tolerance sensitivity with smaller dimensions is obtained to the torsion resonator.

An optimum solution is obtained when the premodulation carrier lies at 132 kHz.

A filter with bending resonators can advantageously be utilized as the mechanical filter in which the bending resonators are held to a low amount of feedback by at least, respectively, two supporting wires which are mounted to the bending node and driven by piezo electric transducers.

A bending resonator filter with a steepened characteristic is thereby advantageous when particularly high requirements are set.

BRIEF DESCRIPTION OF THE DRAWINGS

Other objects, features and advantages of the invention, its organization, construction and mode of operation will be best understood from the following detailed description, taken in conjunction with the accompanying drawings, on which.

DESCRIPTION OF THE PREFERRED EMBODIMENTS

Figure 1:
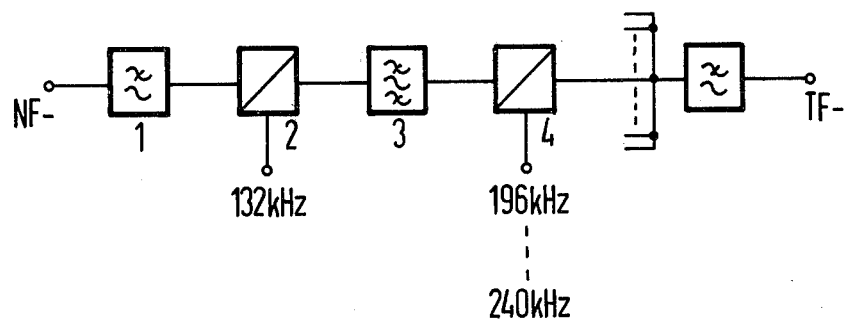
FIG. 1 is a block circuit diagram of a premodulation system.

Referring to FIG. 1, in a block circuit diagram a premodulation system is illustrated in which a voice signal in the audio-position (low frequency) is fed to an input low pass filter 1 which is connected to a premodulator 2. The voice signal is converted into the premodulation position between 132 and 136 kHz. A channel filter 3 is connected to the output of the premodulator 2 and is constructed with bending resonators. The channel filter 3 filters out the upper side band produced by the premodulator 2 and feeds the remainder to a respective channel modulator 4, whereby a transposition is made into the primary group band of 60–108 kHz with the aid of one of a plurality of carriers of 196–240 kHz.

Figure 2:
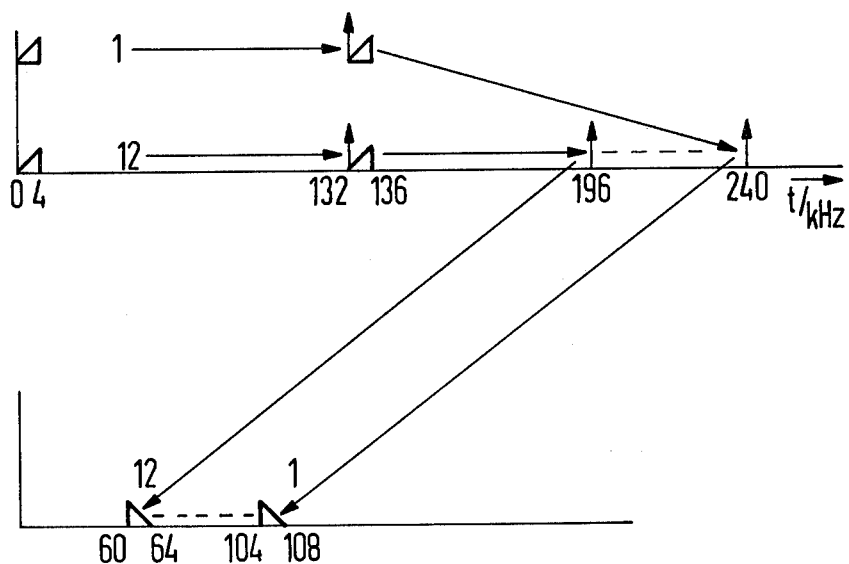
FIG. 2 is a graphic illustration of a modulation scheme.

FIG. 2 illustrates the modulation scheme. The twelve telephone channels lying in the audio positions of 0–4 kHz are converted into the premodulation position of 132–136 kHz with the aid of a 132 kHz carrier. The second modulation position lies within the primary group band in the frequency range of 60–108 kHz, whereas the appertaining carriers lie above the premodulation band in the frequency range of 196–240 kHz.

Figure 3:
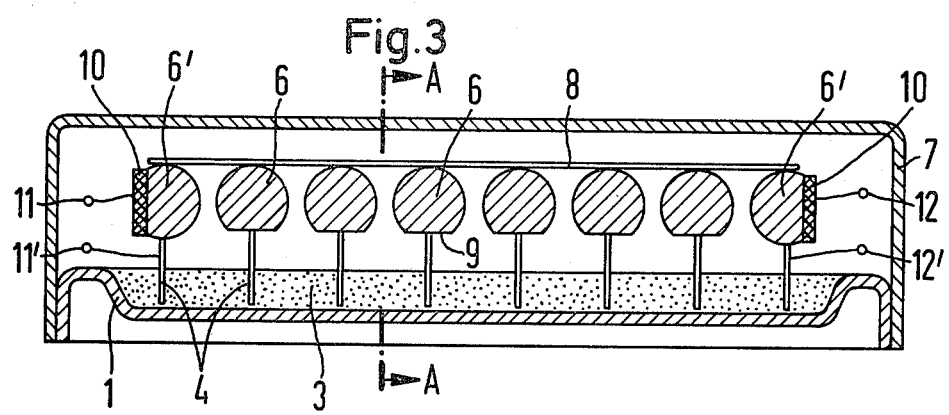
FIG. 3 is a longitudinal sectional view of a mechanical channel filter constructed with bending resonators.
Figure 4:
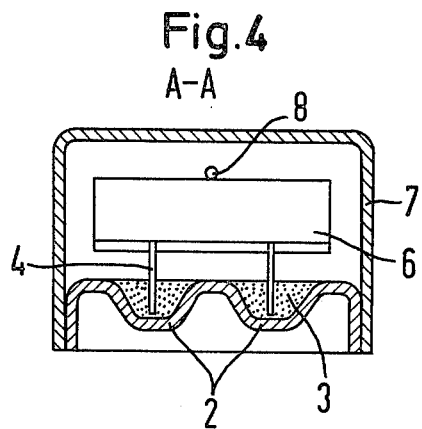
FIG. 4 is a sectional view taken substantially along the line A—A of FIG. 3.

FIG. 3 illustrates a mechanical channel filter constructed with bending resonators and in which no particular measures were undertaken in order to steepen the filter edge characteristic. The mechanical filter constructed in accordance with FIGS. 3 and 4 comprises several mechanical resonators 6 designed in the exemplary embodiment as resonators which carry out bending oscillators. In order to excite or take off, respectively, the mechanical oscillations, i.e. in order to transform electric oscillations into mechanical oscillators and vice-versa, terminal resonators 6' are provided. The resonators 6 and the terminal resonators 6' are arranged in a plane such that their coupling can be carried out by way of a continuous coupling wire 8, preferably attaching the resonators in ranges of great motion amplitude. For a bending resonator operated in the base oscillation this is, for example, the resonator center as is readily apparent from the cross-sectional view of FIG. 4. The resonators 6, 6' comprise rods having a circular cross section which are provided with a flattened surface 9 along one lateral surface area of the resonator. The plane of this flattening in the actual filter resonators lies parallel to the base plates provided for supporting the total system, whereas the terminal resonators 6' are arranged such that the plane formed by the flattening is perpendicular to the general plane formed by the base plate 1. In this manner, the coupling element 8 can be mounted at such locations of the filter resonators 6 and also at the terminal resonators 6' at which the peripheral limitation of the resonators has a circular course, whereby practically a point-shaped supporting surface is provided at the resonators 6 and 6', whose longitudinal axis extends perpendicular to the direction of the coupling element 8. This almost point-shaped connection between the coupling element 8 and the individual resonators 6, 6' again contributes to the fact that dependable and reproducible conditions result with respect to the required coupling effect, which conditions are essential for modern series production when the tuning operation is to be limited to a minimum after assembly of the filter.

The oscillation excitement or the oscillation output is provided by plates 10 which comprise electrostrictive material and which are attached to the flattened surfaces of the resonators 6' in accordance with well-known methods. The plates 10 are provided with a metallization at the side facing away from the resonator and a respective electrical terminal 11, 12 is connected to the metallization. An additional connecting wire, 11' and 12', respectively, is connected to a support element 4. If the connecting terminals 11 and 11' are connected to an electrical AC voltage, the plate 10 of electrostrictive material is subjected to expansions and contractions in the direction of the effective electric field. Due to those longitudinal alternations, expansions and contractions are also produced perpendicularly in relation to the direction of the electric field via the known cross-contraction effect, i.e. in the direction of the longitudinal axes of the resonators 6'. On the basis of these motions, for example, the terminal resonator 6' connected to the terminals 11 and 11' is then excited into bending oscillations when its bending characteristic frequency is precisely, or at least approximately, identical with the frequency of the applied voltage. This bending motion is also transmitted to the remaining resonators 6 and the second terminal resonator 6' by way of the coupling element 8, the resonators then also carrying out bending oscillations in parallel to the base plate 1. Due to these bending oscillations of the second terminal resonator 6', which is connected to the terminals 12, 12', an AC voltage is produced between the metallization carried thereby and the resonator 6' due to the piezo electric effect of the plate 10. This AC voltage can be taken off at the terminals 12, 12' as an output AC voltage. The electric AC voltage can readily, and very accessibly, be fed to the terminal 11, or can be tapped from the terminal 12, respectively, when the flexible wires extending from the metallizations of the electrostrictive plates 10 are extended through an insulating leadthrough attached to the base plate 1. The base plate 1 and the resonators 6, 6' effect the continuous second line required for the formation of a ground non-symmetrical quadripole (four-terminal network). In this manner the filter can be completely assembled and tuned, and subsequently a housing 7 can be rigidly connected with the base plate 1. Relatively short metallic pins 4 are provided for the support of the system, the pins 4 being attached to at least one part of the respective resonators. The pins 4, functioning as support elements, are attached to the resonators 6, 6' at oscillation nodes, whereby natural ranges are to be understood by oscillation nodes, in which practically no amplitude occurs in the oscillation process. At least one notch-shaped indentation 2 is provided in the base plate 1, fashioned such that a casting compound 3 is held therein, even in a liquid condition.

Figure 5:
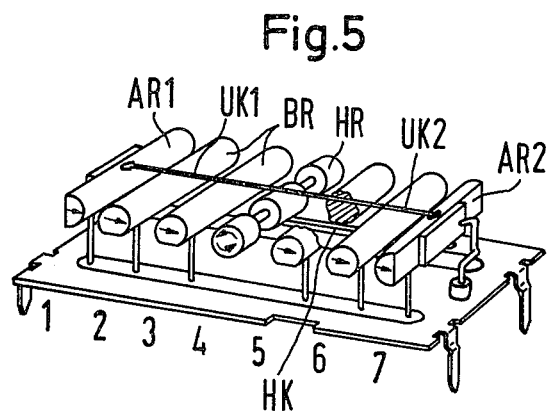
FIG. 5 is a pictorial representation of a filter constructed in accordance with the invention and having steepened filter characteristic edges.

FIG. 5 illustrates a filter having steepened characteristic edges with increased filter requirements. The filter also contains resonators BR which are connected to one another by the main coupler HK. The steepening in this filter is provided by means of an additional coupler UK2 which connects the resonators AR1, HR and AR2. The phase reversal necessary in order to produce the pole with the aid of the coupler UK2 is effected by the particular design of the resonator HR as a dumbbell resonator. The motion in this resonator is at that point at which it is connected to the bridging coupler UK2, directed opposite to the motion to the connecting point with the main coupler HK, in contrast to the motions in the bending resonators, which always have the same direction at the sides opposing one another.

Although we have described our invention by reference to particularly illustrative embodiments thereof, many changes and modifications of the invention may become apparent to those skilled in the art without departing from the spirit and scope of the invention. We therefore to intend to include within the patent warrented hereon all such changes and modifications as may reasonably and properly be included within the scope of our contribution to the art.

We claim:

1. In a carrier frequency communication transmission system which has a premodulation band above the transmission frequency position of a primary group band of 60–108 kHz and which utilizes mechanical filters and a common filter to filter out the primary group band, the improvement comprising:
    a plurality of bending resonators as the mechanical filters; and
    a longitudinal element coupling said bending resonators, the lower limit of the frequency range of the premodulation band set at a frequency spacing of at least 4 kHz from the upper band limit of the primary group band, and
    said longitudinally coupled bending resonators constituting a band-pass filter having disruptive natural oscillations in its lower attenuation range which lie at least 12 kHz below the lower limit of the primary group band.

2. The improved system of claim 1, wherein said bending resonators comprise highly-stabilized piezoceramics.

3. The improved system of claim 1, comprising:
    a premodulator connected ahead of the channel filters; and
    means providing a 132 kHz carrier to said premodulator.

4. The improved system of claim 1, wherein said coupling element comprises:
    a wire connected to each of said bending resonators at their respective centers.

5. The improved system of claim 4, comprising:
    a filter base; and
    a respective pair of support wires for each of said bending resonators, said support wires connected to said base and connected to said resonators at bending nodes to minimize feedback.

6. The improved system of claim 5, comprising:
    input piezoelectric transducer means connected to drive said bending resonators.

7. The improved system of claim 5, comprising:
    output piezoelectric means connected to provide an output signal from said bending resonators.

8. The improved system of claim 1, wherein said mechanical filters are filters having a steepened filter characteristic.

9. The improved system of claim 1, and further comprising means for providing a steepened filter characteristic including
    a torsional resonator located within said plurality of bending resonators; and
    a further longitudinal coupling element coupling said torsional resonator with at least two of said bending resonators.

10. The improved system of claim 9, wherein said torsion resonator comprises a dumbbell resonator.

* * * * *